United States Patent [19]

Watari

[11] Patent Number: 4,792,976
[45] Date of Patent: Dec. 20, 1988

[54] PATTERN RECOGNIZING DEVICE WITH PATTERN MATCHING IN SLANT PARALLELOGRAMMIC BLOCKS OF WIDTHS DEPENDENT ON CLASSIFIED REFERENCE PATTERN LENGTHS

[75] Inventor: Masao Watari, Tokyo, Japan
[73] Assignee: NEC Corporation, Tokyo, Japan
[21] Appl. No.: 809,968
[22] Filed: Dec. 17, 1985

[30] Foreign Application Priority Data

Dec. 19, 1984 [JP] Japan .................. 59-267830

[51] Int. Cl.$^4$ .............................. G01L 1/00
[52] U.S. Cl. ........................ 381/43; 364/513.5
[58] Field of Search .................. 381/41–45; 364/513.5

[56] References Cited

U.S. PATENT DOCUMENTS

| | | | |
|---|---|---|---|
| 4,049,913 | 9/1977 | Sakoe | 381/43 X |
| 4,059,725 | 11/1977 | Sakoe | 381/43 X |
| 4,256,924 | 3/1981 | Sakoe | 381/43 |
| 4,277,644 | 7/1981 | Levinson et al. | 381/43 X |
| 4,286,115 | 8/1981 | Sakoe | 381/43 |
| 4,319,221 | 3/1982 | Sakoe | 381/43 X |
| 4,400,788 | 8/1983 | Myers et al. | 381/43 X |
| 4,403,114 | 9/1983 | Sakoe | 381/43 X |
| 4,467,437 | 8/1984 | Tsuruta et al. | 381/43 X |
| 4,528,688 | 7/1985 | Ichikawa et al. | 381/43 |
| 4,555,796 | 11/1985 | Sakoe | 381/43 |
| 4,570,232 | 2/1986 | Shikano | 381/43 X |
| 4,571,697 | 2/1986 | Watanbe | 381/43 X |

Primary Examiner—Patrick R. Salce
Assistant Examiner—Emanuel Todd
Attorney, Agent, or Firm—Sughrue, Mion, Zinn, Macpeak, and Seas

[57] ABSTRACT

On pattern matching an input pattern arranged along a first time axis to each concatenation of patterns selected from reference patterns and arranged along a second time axis with feature vectors of the input pattern and the concatenation placed at a common frame period, a dynamic programming algorithm is used by classifying the reference patterns into classes in compliance with reference pattern lengths and by giving variable block widths to slant parallelogrammic blocks of a common block slope. The variable widths should be decided for the respective classes. Preferably, a k-th class comprises a reference pattern of a reference pattern length which is not shorter than $\beta kW$ and is shorter then $\beta(k+1)W$, where $\beta$ represents the block slope and W, a fundamental block width determined by the block slope under a minimum of the reference pattern lengths. In this event, the variable block width is equal to kW. The algorithm is carried out by scaling the first time axis, not by the frame period, but by block numbers assigned to slant parallelogrammic blocks having the fundamental width in common and by checking whether or not each block number is an integral multiple of k.

4 Claims, 9 Drawing Sheets

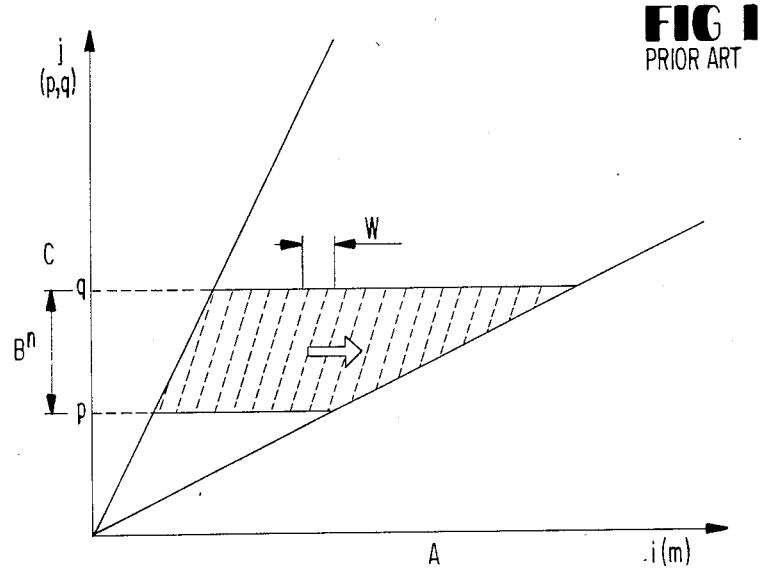
FIG 1
PRIOR ART
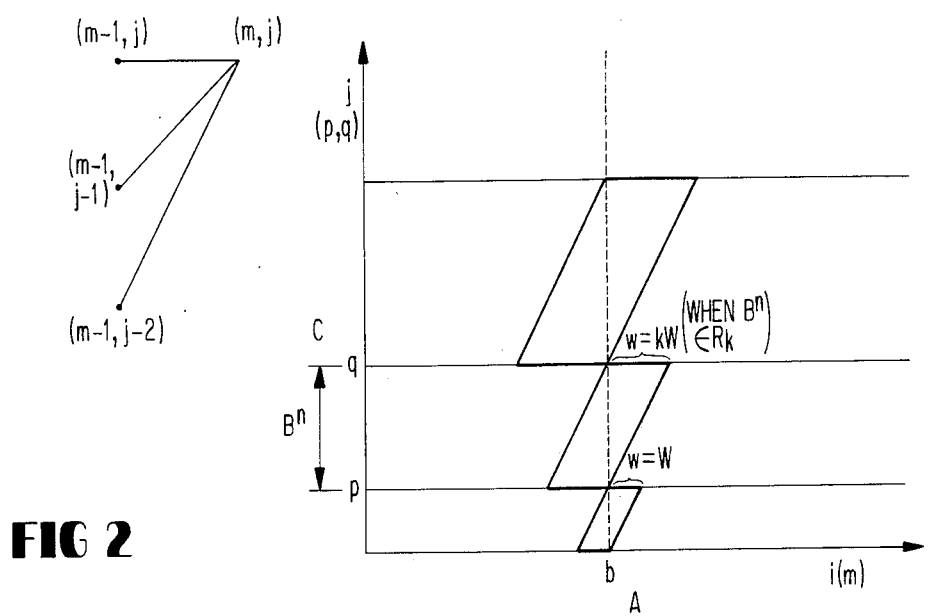
FIG 2
FIG 3

PATTERN RECOGNIZING DEVICE WITH PATTERN MATCHING IN SLANT PARALLELOGRAMMIC BLOCKS OF WIDTHS DEPENDENT ON CLASSIFIED REFERENCE PATTERN LENGTHS

BACKGROUND OF THE INVENTION

This invention relates to a device for recognizing by pattern matching an input pattern representative of input words which are substantially continuously spoken or uttered and whose sequence is determined in compliance with a finite state grammar. The pattern matching is carried out between the input pattern and a plurality of reference patterns representative of reference words, respectively, by resorting to a dynamic programming (DP) technique or algorithm.

A device for recognizing an input pattern representative of continuously spoken words, is usually called either a continuous speech recognition device or a connected word recognizing device and has a wide field of application. The continuously spoken words may, for example, be computer programs, sentences in business documents, directions for flight or navigation control, and instructions for various apparatus. It is known in principle that a high reliability is achieved in recognition of an input pattern obtained according to a finite state grammar when the pattern matching is restricted by rules of the finite state grammar. In a relatively simple case, errors are avoided in recognition of an input pattern when a rule is used as a restriction on the number of words of the input pattern in the manner revealed in U.S. Pat. No. 4,049,913 issued to Hiroaki Sakoe and assigned to the present assignee.

A considerable improvement is introduced to such continuous speech recognition devices by a method and an apparatus disclosed in U.S. patent application Ser. No. 719,603 previously filed Apr. 3, 1985, by Masao Watari, the present applicant, based on Japanese patent application No. 68,015 of 1984. The improvement is directed mainly to a system revealed in U.S. patent application Ser. No. 448,088 filed Dec. 9, 1982, by the above-named Hiroaki Sakoe based on Japanese patent application No. 199,098 of 1981. The system is for recognizing an input pattern which represents input words continuously spoken according to a finite state grammar. The input pattern has a certain input pattern length. More particularly, the continuously spoken words are represented as the input pattern by a sequence of input pattern feature vectors arranged along a first time axis at consecutive input pattern frame periods, resepectively. Each input pattern frame period is herein referred to simply as a frame. It is therefore possible to say that the input pattern length consists of a plurality of frames which are consecutively arranged along the first time axis. Although already issued as U.S. Pat. No. 4,555,796, the Sakoe patent application will be so referred to throughout the following for distinction from the first-cited Sakoe patent.

In the manner which will later be described a little more in detail, the improved apparatus of the previous Watari patent application is operable according to a slant-blockwise DP algorithm wherein each slant parallelogrammic block has a width which is equal to a predetermined number of the frames. The apparatus comprises memory means, concatenating means, matching means, and deciding means.

The memory means is for memorizing first through N-th reference patterns representative of first through N-th reference words, respectively, where N represents a predetermined natural number. An n-th one of the reference patterns has an n-th reference pattern length where n represents each of one through N. The reference pattern lengths of the respective reference patterns are measured in terms of the frames in the manner which will later become clear.

The concatenating means is for concatenating the reference patterns into a plurality of concatenations. Each concatenation consists of selected reference patterns which are selected from the first through the N-th reference patterns according to the grammar and are arranged along a second time axis. It is possible to understand without loss of generality that the second time axis is orthogonal to the first time axis.

The matching means is for pattern matching the input pattern with the concatenations in slant parallelogrammic blocks to provide dissimilarity measures between the input pattern and the respective concatenations. Each block has a predetermined slope relative to the first time axis and a width and a height which are parallel to the first and the second time axes and equal to a selected number of the frames and to the reference pattern length of each selected reference pattern of each concatenation.

The deciding means is for deciding a minimum of the dissimilarity measures to recognize the input pattern as one of the concatenations that is pattern matched to the input pattern to provide the minimum of the dissimilarity measures.

More specifically, the selected number should not be longer than a quotient which is equal to the predetermined slope under a minimum of the first through the N-th reference pattern lengths. The blocks therefore have widths which are restricted to a narrow width by the minimum reference pattern length.

On the other hand, the pattern matching is carried out by accessing various memories a number of times which are reversely proportional to the widths of the blocks. In other words, the apparatus is operable at a speed which is reversely proportional to the block width. If only one of the reference pattern lengths is considerably short, the speed becomes slow. The speed must be raised by the use of high-speed memory elements as the memories. The apparatus becomes bulky and expensive.

SUMMARY OF THE INVENTION

It is therefore an object of the present invention to provide a continuous speech recognition device which is highly reliable and is operable at a high speed.

It is another object of this invention to provide a continuous speech recognition device of the type described, which is not expensive.

Other objects of this invention will become clear as the description proceeds.

It is possible on describing this invention to define a continuous speech recognition device as a device for recognizing an input pattern which represents input words continuously spoken according to a finite state grammar and has an input pattern length consisting of a plurality of frames consecutively arranged along a first time axis. The device comprises: memory means for memorizing first through N-th reference patterns representative of first through N-th reference words, respectively, wherein an n-th one of the reference patterns has an n-th reference pattern length measured in terms of the frames, where N and n represent a predetermined natural number and each of one through N, respectively; concatenating means for concatenating the reference patterns into a plurality of concatenations wherein each concatenation consists of selected reference patterns which are selected from the first through the N-th reference patterns according to the grammar and are arranged along a second time axis that is orthogonal to the first time axis; matching means for pattern matching the input pattern with the concatenations in slant parallelogrammic blocks to provide dissimilarity measures between the input pattern and the respective concatenations wherein each block has a predetermined slope relative to the first time axis and a width and a height which are parallel to the first and the second time axes and equal to a selected number of the frames and to the reference pattern length of each selected reference pattern of each concatenation; and deciding means for deciding a minimum of the dissimilarity measures to recognize the input pattern as one of the concatenations that is pattern matched to the input pattern to provide the minimum of the dissimilarity measures.

According to this invention, the memory means of the above-defined device is for memorizing the first through the N-th reference patterns with the first through the N-th reference patterns classified into first through K-th classes according to the first through the N-th reference pattern lengths where K represents a preselected natural number. A K-th class comprises at least one of the first through the N-th reference patterns where k represents a variable natural number which is variable for the first through the K-th classes. The matching means is for pattern matching the input pattern with the concatenations to provide the dissimilarity measures with the selected number selected in consideration of the predetermined slope and the variable natural number of one of the classes that comprises the above-mentioned each reference pattern.

BRIEF DESCRIPTION OF THE DRAWING

FIG. 1 is a schematic diagram for use in describing a prior art algorithm;

FIG. 2 shows a few lattice points on an i-j plane on an enlarged scale;

FIG. 3 is a schematic diagram for use in describing an algorithm used in a continuous speech recognition device according to the instant invention;

DESCRIPTION OF THE PREFERRED EMBODIMENTS

Figure 4:
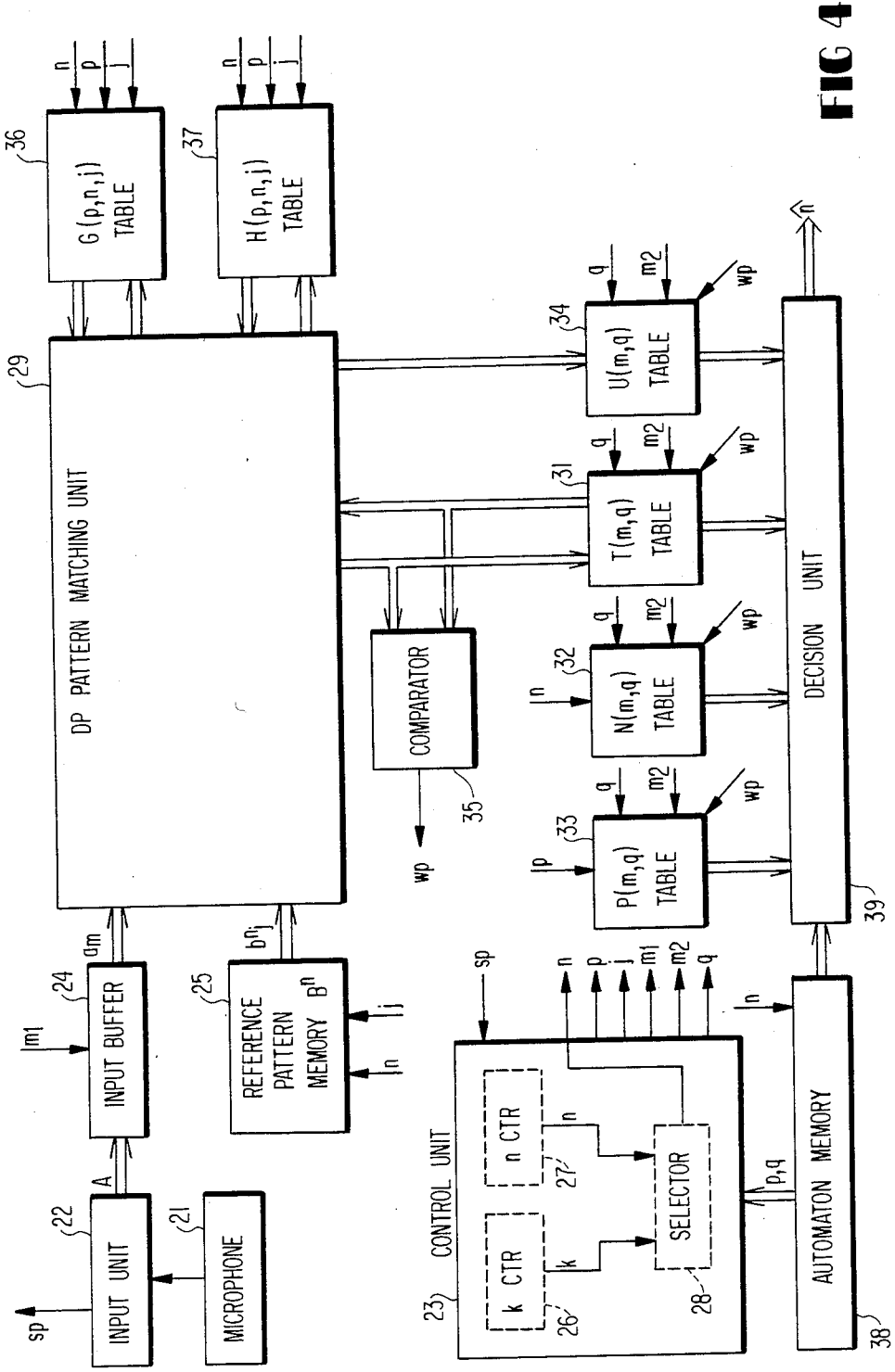
FIG. 4 is a block diagram of a continuous speech recognition device according to a preferred embodiment of this invention.

Referring to FIGS. 1 and 2, description will briefly be given at first as regards an algorithm which is used in an apparatus disclosed in the above-referenced previous Watari patent application. This is in order to facilitate an understanding of the present invention. It should be noted that the apparatus is for use in recognizing an input pattern. A representative of a string or chain of input words which are substantially continuously spoken in compliance with a finite state grammar.

In the manner described also in the above-cited Sakoe patent application (now U.S. Pat. No. 4,555,796), an automaton $\alpha$ is used in describing the finite state grammar for the apparatus. The automaton $\alpha$ is defined by:

$$\alpha = <P, R, S, p_0, F>,$$

where P, R, S, $p_0$, and F represent a set of states, a set of reference words, a state transition table, an initial state, and a set of final states, respectively. The set of states P and the like are as follows.

The reference word set R consists of first, second, ..., n-th, ..., and N-th reference words where N represents a predetermined natural number. It is possible to identify such reference words by reference word identification numbers assigned to the respective reference words. The reference word identification numbers may be from unity to the predetermined natural number N. In this event, the reference word set R is represented by a symbol $\{n | 1, 2, \ldots, N\}$.

The input pattern A is supplied to the apparatus as an input pattern signal which can be designated also by the reference letter A. In the manner known in the art, the input pattern signal A is a time sequence of first, second, ..., i-th, ..., and I-th input pattern feature vectors $a_1$, $A_2$, ..., $a_i$, ..., and $a_I$. Each input pattern feature vector has a duration which is called an input pattern frame period. The first through the I-th input pattern feature vectors are therefore arranged successively at a plurality of consecutive input pattern frame periods. It should be pointed out here that each of such vectors is represented by a usual letter for convenience of print rather than either by a bold letter or by a usual letter with an arrow over the letter.

The input pattern A is alternatively represented by A(O, I) where 0 (zero) represents a zeroth input pattern feature vector which is not used in fact and may be a zero vector. It is possible to understand that the zeroth through the I-th input pattern feature vectors are arranged along a first time axis at zeroth through I-th input pattern time instants i in the manner depicted in FIG. 1. The zeroth and the I-th time instants are called an input pattern start point or time instant and an input pattern end point or, alternatively, an initial and a final point. The input pattern A or A(O, I) has an input pattern length which is equal to I when measured in terms of the input pattern frame period. The input pattern length will therefore be designated by the reference letter I.

The apparatus keeps the first through the N-th reference words as first, second, ..., n-th, ..., and N-th reference patterns $B^1$, $B^2$, ..., $B^n$, ..., and $B^N$, respectively. Like the reference words, the reference patterns are identified by reference pattern identification numbers and are specified in the apparatus by a reference pattern identification signal which specifies one of the reference pattern identification numbers at a time. The reference pattern identification numbers and the reference pattern identification signal will be denoted by the reference letter n. It may be mentioned here that the same reference letter, such as n, will herein be used in designating related signal, numbers, and the like.

When measured by a certain unit time, the n-th reference pattern $B^n$ has an n-th reference pattern length which is usually designated by $J^n$ and will herein be denoted by J(n) for clarity of print. The input pattern frame period is conveniently used as the unit time and is therefore referred to simply as a frame. The n-th reference pattern is given by a train of first, second, ..., j-th, ..., and J(n)-th reference pattern feature vectors $b^n_1$, $b^n_2$, ..., $b^n_j$, ..., and $b^n_{J(n)}$ which are used as a time sequence on recognizing the input pattern A. It is possible to designate the n-th reference pattern also by B(O, J(n)) where 0 (zero) represents a zeroth reference pattern feature vector of the n-th reference pattern. The zeroth and the J(n)-th reference pattern feature vectors are placed at an initial and a final point of the n-th reference pattern. The time sequence of the n-th reference pattern $B^n$ or B(O, J(n)) will be called an n-th reference pattern signal.

The reference word set R is selected so as to cover the input words used in various strings. In other words, each string is a permutation with repetition of selected reference words which are selected from the reference word set R, namely, from the first through the N-th reference words. The selected reference words should be arranged in the permutation according to the finite state grammar. On carrying out comparison with the string, the first through the N-th reference words are arranged into various permutations in compliance with the finite state grammar with repetition allowed. Each permutation of the reference words is represented by a concatenation C of first, second, ..., x-th, ..., and X-th selected patterns $B^{n1}$, $B^{n2}$, ..., $B^{nx}$, ..., and $B^{nX}$ where X represents a natural number which depends on the concatenation in question. The first through the X-th selected patterns of the concatenation C are the nl-th through the nX-th reference patterns where the reference pattern identification numbers nl through nX need not be in the order of unity through the predetermined natural number N. In the concatenation C, the final point of a selected pattern coincides with the initial point of a next following selected pattern. Only the first selected pattern $B^{nl}$ has the initial point which serves as an initial point of the concatenation C. The final point of the nX-th selected pattern $B^{nX}$ serves as a final point of the concatenation C.

The comparison is carried out by pattern matching of the input pattern A with, in principle, each of such concatenations. It is convenient to understand that the reference pattern feature vectors of the selected pattern are arranged in each concatenation along a second time axis at concatenation time instants j in the manner illustrated in FIG. 1, that the second time axis is orthogonal to the first time axis in a time space represented by an i-j plane, and that a time interval between two adjacent concatenation time instants is equal to the frame so as to define lattice or grid points (i, j) on the i-j plane in the manner depicted in FIG. 2. The concatenation time instants j are, however, counted from unity up to the reference pattern length, such as J(n), for each of the second and the following selected patterns. The first selected pattern alone has the concatenation time instant of zero.

During the comparison, each selected pattern of each concatenation is pattern matched to various parts of the input pattern A. Such a part is called a partial or fragmentary pattern and is represented by A(u,m), where each of u and m represents one of the zeroth through the I-th time instants and where the m-th time instant should be later along the first time axis than the u-th time instant. The u-th and the m-th time instants are referred to either as a partial pattern start point and a partial pattern end point or simply as start and end points.

The automaton $\alpha$ has a finite number of states which are specified by state identification numbers 1, 2, ..., p, ..., and $\pi$ where $\pi$ represents the finite number. The state set P consists of such states, namely, $\{p | 1, 2, ..., \pi\}$. During the pattern matching, transition of states occurs in accordance with transition rules. More particularly, the states varies from a start state p to an end state q in response to each selected pattern of each concatenation. Although differently designated for convenience of the description which follows, the end state is one of the states of the state set P. It is necessary for each selected pattern that the start and the end states be specified by two consecutive state identification numbers. The end state q for a selected pattern of a concatenation is usually a start state p for another selected pattern that next follows in the concatenation the selected pattern under consideration. It will be said in the following that the start and the end states are had by a selected pattern.

For all concatenations, the state transition begins at the initial state $p_0$ which can be regarded as a zeroth state and will hereafter be represented by a state identification number of 0 (zero). Also for all concatenations, the end states are the final states which form the final state set F and belong to the state set P as a subset of the final states. Each transition rule may be written by $$p \xrightarrow{n} q$$

where n represents the selected pattern which has the start state p and the end state q. The transition rule may alternatively be represented by a combination (p, q, n). The state transition table S shows a set of the transition rules $\{(p, q, n)\}$.

The pattern matching is carried out by calculating at first a measure or degree representative of either similarity or dissimilarity between the input pattern A and each concatenation. It is convenient for this purpose to understand in the manner described above in conjunction with FIG. 1 that the input pattern A and the concatenation C are arranged along the first and the second time axes and that the input and the reference pattern feature vectors $a_i$ and $b^n_j$ are placed at the input pattern and the concatenation time instants i and j which define the lattice points (i, j) on the i-j plane as exemplified in FIG. 2. Merely for convenience of description, a dissimilarity measure d(m, j) will be used which is given by a "distance" between each input pattern feature vector $a_m$ and each reference pattern feature vector $b^n_j$ where the reference letter m is used to indicate a current input pattern time instant for which calculation of the distance is in progress. Such distances are summed up along various matching paths from the initial state to each final state to provide an overall distance between the input pattern A and the concatenation which has the final state under consideration.

Such overall distances are calculated for the respective concatenations by resorting to a dynamic programming (DP) technique or algorithm. More specifically, a distance recurrence formula is calculated for each start state and each selected pattern which has the start state in question and is used as a current reference pattern, namely, for all pairs (p, n) used in the transition rules (p, q, n) which are included in the state transition table S. The distance recurrence formula may be represented by:

$$g(m,j) = g(m-1, \hat{j})$$

where $g(m, j)$ is called a new recurrence value, $g(m-1, \hat{j})$ is named a minimum recurrence value, and $\hat{j}$ represents an argument that minimizes several previous recurrence values $g(m-1, j')$ in which the concatenation time instant $j'$ is equal to or greater than $(j-2)$ and is equal to or less than $j$ in the manner shown in FIG. 2. Namely:

$$\hat{j} = \arg \min g(m-1, j'),$$

where:

$$j-2 \leq j' \leq j.$$

By using the distance recurrence formula, the pattern matching is carried out in slant or inclined parallelogrammic blocks on the i-j plane. The blocks have a common block slope $\beta$ relative to the first time axis and a common or fundamental block width W in terms of the frame. The block slope is equal to the maximum of path slopes of DP paths exemplified in FIG. 2. In the example being illustrated, the block slope $\beta$ is equal to two. The block width W is decided according to:

$$J_{min} \geq \beta W,$$

where $J_{min}$ represents the minimum of the first through the N-th reference pattern lengths. For the current reference pattern, the blocks are identified by block identification numbers b consecutively parallel to the first time axis and have a common block height which is equal to the reference pattern length of the current reference pattern.

In practice, the DP technique is carried out by using a minimum recurrence value $T(m, q)$ and a boundary recurrence value $G(p, n, j)$ and a first and a second initial condition therefor. The minimum and the boundary recurrence values will become clear as the description proceeds. Under the first initial condition, the minimum recurrence value is equal to zero for $T(O, O)$ and is infinitely great, namely, sufficiently greater than possible minimum recurrence values, for $T(m, q)$ other than $T(O, O)$. Under the second initial condition, the boundary recurrence value is infinitely great. The distance recurrence formula is iteratively calculated for each pair (p, n) and then for another pair. For each pair, the iterative calculation proceeds in the manner indicated in FIG. 1 by a double-line arrow from a first block of the block identification number of unity to an end block of the block identification number which is equal to I/W where it is assumed merely for simplicity of description that the input pattern length I is an intefral multiple of the block width W. One of the blocks for which the iterative calculation is in progress, will be called a current block. Each block, if any, will be called a previous block for which the iterative calculation is already carried out. The calculation may be carried out for only those of the blocks which are on both boundaries and within the window known in the art.

The iterative calculation is carried out for the current block with a first and second boundary condition and from a j-th start value $m_{sj}$ of the input pattern time instant $i$ up to a j-th end value $m_{ej}$ with the value of the concatenation time instants j varied from unity to the reference pattern length, such as J(n), of the current reference pattern. The second boundary condition and the j-th start and end values will presently be described. The first boundary condition is as follows:

$$g(m-1, 0) = T(m-1, p),$$

where the input pattern time instant m varies from a zeroth start value $m_{s0}$ to a zeroth end value $m_{e0}$ which are defined by:

$$m_{s0} = (b-1)W + 1$$

and $$m_{e0} = bW,$$

where the block identification number b should be that of the current block.

The second boundary condition and the j-th start and end values are as follows:

$$g(m_{sj}-1, j) = G(p, n, j),$$

$$m_{sj} = m_{s0} + [j/\beta],$$

and $$m_{ej} = m_{sj} + W - 1,$$

where a pair of brackets is used as the Gauss' notation known in mathematics. A block boundary between the current block and a next previous block will now be called a start block boundary. That between the current block and a next succeeding block will be called an end block boundary. Whenever the calculation reaches the j-th end value on the end block boundary, an end boundary value $g(m_{ej}, j)$ is substituted in the boundary recurrence value $G(p, n, j)$ for a start boundary value $g(m_{sj}, j)$ which is previously obtained as the end boundary value for the next previous block on the start block boundary.

Concurrently with the iterative calculation of the distance recurrence formula for the current block, a pointer recurrence formula is calculated for a pointer $h(m, j)$ which is known in the art and is alternatively called a path value. The pointer recurrence formula is such that:

$$h(m, j) = h(m-1, \hat{j}),$$

where $h(m-1, \hat{j})$ represents an optimum pointer among previous pointers $h(m-1, j')$. The pointer recurrence formula is iteratively calculated for the current block by using a boundary pointer value $H(p, n, j)$ and under third and fourth boundary conditions which will shortly be described. Whenever the pointer recurrence formula is calculated up to the j-th end value, an end pointer value $h(m_{ej}, j)$ is substituted in the boundary pointer value $H(p, n, j)$ for a start pointer value $h(m_{sj}, j)$. The third and the fourth boundary conditions are as follows:

$$h(m-1, 0) = m-1,$$

for the input pattern time instants m of the zeroth start value $m_{s0}$ through the zeroth end value $m_{e0}$, and:

$$h(m_{sj}-1, j) = H(p, n, j).$$

When the distance and the pointer recurrence formulae are calculated up to the end block and up to the reference pattern length J(n) of the current reference pattern, the pattern matching comes to an end between the current reference pattern and a plurality of partial patterns A(u, m) which have start points u on a first solid line depicted in FIG. 1 for the start state p and have end points m on a second solid line drawn for the end state q. A pattern end value g(m, J(n)) is obtained as the new recurrence value for each end point m.

Attention will now be directed to a pattern end boundary between the current reference pattern and a next subsequently concatenated reference pattern. It will be presumed that a few other reference patterns are already pattern matched as other selected patterns with certain partial patterns and have the end state on the pattern boundary. When such pattern end values are obtained for the current reference pattern and the other selected patterns, minimization is carried out at the pattern end boundary as follows for the pattern end values. When mathematically represented, the minimization at the pattern end boundary is such that:

if the pattern end value g(m, J(n)) for the current reference pattern is less than the minimum recurrence value T(m, q), then:

$$T(m, q) = g(m, J(n)),$$

$$N(m, q) = \hat{n},$$

$$P(m, q) = \hat{p},$$

and $$U(m, q) = h(m, J(n)),$$

for the input pattern time instants m of the J(n)-th start value through the J(n)-th end value which may simply be denoted by $m_s$ and $m_e$. In the mathematical representations, N(m, q), P(m, q), and U(m, q) will now be called a reference pattern value, a start state value, and a start point value.

In this manner, the minimum recurrence value T(m, q) is obtained for a particular reference pattern ñ among the current reference pattern and the other selected patterns. The reference letter p indicates a particular start state which the particular reference pattern has as the start state p. The start point value indicates a particular start point û of a particular partial pattern A(û, m) that best pattern matches with the particular reference pattern and has the end point at the m-th input pattern time instant.

When the end state q becomes one of the final states of the final state set F, the pattern matching of the input pattern A comes to an end for concatenations which have that one of the final states in common. In this manner, the input pattern A in pattern matched to the concatenations having the respective final states. At this instant, the pattern end values g(m, J(n)) are calculated as concatenation end values for the partial patterns having the end points at the final point I in common and for the selected patterns which have the respective final states as the end states q and stand last in the respective concatenations. The concatenation end values are therefore designated by g(I, J(n)).

Minimization at the pattern boundary, which now coincides with pattern ends of the concatenations having a common final state, is carried out as before. After the minimization is carried out for the pattern ends of all concatenations, minima of the concatenation end values give ultimate recurrence values T(I, q) where the end states q form a final state subset which the final state set F comprises. Among the concatenations, an optimum concatenation is decided as follows starting at a set of initial conditions such that:

$$Q = \arg\min T(I, q),$$

$$q = Q,$$
and $$m = I,$$

where Q represents an optimum final state. Optimum reference patterns ñ, optimum end states q̂, and optimum start points û are decided in accordance with:

$$\hat{n} = N(m, q),$$

$$\hat{q} = P(m, q),$$

and $$\hat{u} = U(m, q),$$

by iteratively putting q̂ for q and û for m until the optimum start point û becomes the initial point 0 (zero). The string of the input words is now recognized as one of the permutations of the reference words that is represented by the optimum concatenation.

Referring to FIG. 3 anew and to FIG. 2 again, an algorithm will first be described which is for use in a continuous speech recognition device according to this invention. The algorithm is similar to that described above with reference to FIGS. 1 and 2. It is, however, to be noted at first that the first through the N-th reference patterns $B^1$ to $B^N$ are classifed into first, second, ..., k-th, ..., and K-th classes or reference pattern subsets $R_1$, $R_2$, ..., $R_k$, ..., and $R_K$ according to the first through the N-th reference pattern lengths J(1) to J(N) where K represents a preselected natural number which will presently be described and where k is used as class identification numbers and will be regarded as representing a variable natural number which is variable for the first through the K-th classes, namely, between unity and the preselected natural number K, both inclusive.

Some of the classes may be empty or void sets. It will, however, be assumed that the k-th class comprises at least one reference pattern of the first through the N-th reference patterns. The at least one reference pattern has a reference pattern length J(n) which satisfies:

$$\beta W f_k(k) \leq J(n) < \beta W f_{k+1}(k+1),$$

where $f_k(k)$ represents a k-th predetermined function of the variable natural number k. In practice, a linear function of the variable natural number is used in common as the first through the (K−1)-th predetermined functions. In this event, the reference patterns are classified into the classes according to:

$$\beta k W \leq J(n) < \beta(k+1)W.$$

In the second place, the slant parallelogrammic blocks are given new variable block widths w. Each variable width w is equal to a selected number of the frames. The selected number is selected in consideration of the block slope β and the variable natural number k of the class that comprises the selected pattern of each concatenation. Typically, the variable width w is k times the fundamental or common block width W, namely, equal to kW. Such variable widths w are exemplified in FIG. 3 with an assumption such that the concatenation C comprises first through third selected patterns of successively increasing reference pattern lengths.

To speak of the preselected natural number K, it should be noted that the fundamental block width W is decided by the minimum reference pattern length $J_{min}$. A maximum of the first through the N-th reference pattern lengths is known from the reference word set R and will be denoted by $J_{max}$. The preselected natural number K is automatically selected when a difference between the maximum and the minimum reference pattern lengths, namely, $J_{max}$ minus $J_{min}$, is divided by the fundamental block width W.

In the manner which will be described in the following, the distance and the pointer recurrence formulae are calculated in the slant parallelogrammic blocks of the variable widths w. It is convenient to surmise that the block identification numbers b are assigned to the blocks of the fundamental width W as before rather than to the blocks of the variable widths w. In other words, the first time axis is scaled by the fundamental block width W at first rather than by the frame. On iteratively calculating the recurrence formulae, each block identification number b is checked at first whether or not the block identification number is an integral multiple of the variable natural number k. If the block identification number is not the integral multiple, check is secondly carried out whether or not the block identification number is equal to I/W. Mathematically, the check is whether or not:

$b/k - [b/k] = 0$ and $b = I/W$, where the brackets are used again as the Gauss' notation. Only when the block identification number b is either an integral multiple of the variable natural number k or equal to I/W, the block identification number corresponds to a broken line which is vertically drawn in FIG. 3. In this manner, each block of the variable block width w is selected for the pattern matching.

It should be pointed out in this connection that the common block slope β is predetermined so that each block of the fundamental block width W may have a diagonal which is perpendicular to the first time axis and consequently parallel to the second time axis. Selection of the blocks of the variable block widths w is carried out so that each pair of the blocks may have colinear diagonals.

The distance and the pointer recurrence formulae are calculated iteratively for each selected pattern of the k-th class and with the zeroth and the j-th start and end values given according to:

$m_{s0} = (b-1)w/k + 1$, $m_{e0} = \min[m_{s0} + w - 1, I]$, $m_{sj} = m_{s0} + [j/\beta]$, and $m_{ej} = m_{sj} + w - 1$, where the j-th start value is not different from that described before in connection with the previous Watari patent application. The zeroth start through end values correspond to the start points u of various partial patterns A(u, m).

Minimization is carried out at the pattern boundary as above except that the J-th end value $m_e$ is given by $(m_{sJ} + w - 1)$ rather than by $(m_{sJ} + W - 1)$. The J-th start through end values correspond to the end points m of the partial patterns A(u, m). Decision of the optimum concatenation is not different from the afore-described decision. Incidentally, the concatenations are formed because the automaton α specifies in a more general fashion the format described in U.S. Pat. No. 4,286,115 issued to the said Hiroaki Sakoe, assignor to the instant assignee.

It is to be noted that a plurality of blocks of the fundamental width W are processed in parallel in each block of the variable width w. The parallel processing is possible because of the following. First of all, it will be assumed that the minimum reference pattern length $J_{min}$ is equal to βkW. The fundamental width becomes equal to the variable width w for the reference pattern or patterns of the k-th class. The parallel processing is therefore possible in each of the blocks of a new common width which is equal to the variable width w. Secondly, first and second conditions must be satisfied in order that the blocks of different variable widths w be processed in parallel. The first condition is such that all initial conditions are known before processing the blocks. The second condition is such that results of the processing do not destruct the initial conditions for other blocks in the manner discussed in the Sakoe patent application (now U.S. Pat. No. 4,555,796) as regards a loop with reference to FIGS. 2 and 3 thereof. As for the first condition, attention should be directed to the fact that the [(b−1)/k]-th block is processed as the (b−1)-th block on processing the b-th block. The results of processing are already obtained for use as the initial conditions for the b-th block. As regards the second condition, the facts should be understood that the results of precessing of the b-th block are used later and therefore do not destruct the initial conditions for the b-th block and the previous blocks.

Figure 5:
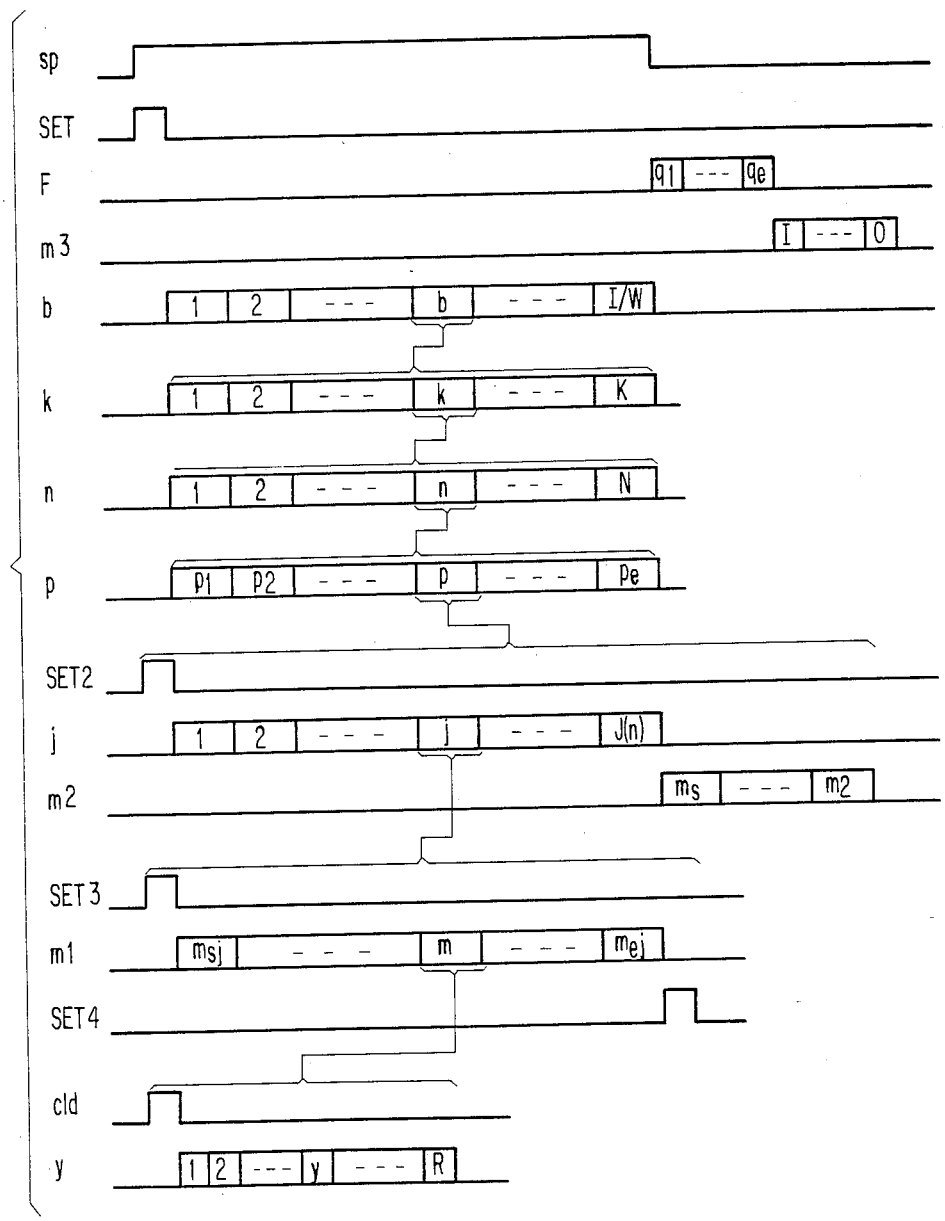
FIG. 5 is a schematic time chart of various signals used in the device depicted in FIG. 4.

Referring now to FIGS. 4 and 5, description will proceed to a continuous speech recognition device according to a preferred embodiment of this invention. A string of input words are substantially continuously spoken to a microphone 21 and thereby converted to an electrical signal of a duration of a speech interval which depends on the number of the input words and durations of the respective input words. Responsive to the electrical signal, an input unit 22 produces a speech interval signal sp. It will be assumed merely for convenience of description that the speech interval signal builds up to a high level from a low level at the beginning of the speech interval and builds down to the low level at the end thereof in the manner depicted in FIG. 5 along a first or top line. Supplied with the speech interval signal, a control unit 23 generates various control signals which are used in controlling other parts of the device as will be described in the following.

The input unit 22 furthermore produces the input pattern signal A described heretobefore. The input pattern signal is delivered to an input buffer 24 which is for temporarily storing a part of the input pattern signal. The input pattern signal part will become clear later. The input buffer 24 successively produces some of the input pattern feature vectors $a_m$ in response to a first input pattern vector identification signal m1 which is generated by the control unit 23 in the manner which will later be described.

A reference pattern memory 25 is for memorizing the first through the N-th reference patterns $B^1$ to $B^N$. The reference pattern memory 25 is supplied from the control unit 23 with the reference pattern identification signal n which is produced in an appreciably different manner as compared with a conventional reference pattern identification signal. More particularly, the control unit 23 comprises a class identification number (k) counter 26 for counting up the class identification number from unity up to the preselected natural number K in the manner which will later be described and is illustrated in FIG. 5 along a sixth line from the top. In this manner, the k counter 26 serves as a specifying arrangement for specifying one of the first through the K-th classes as a specified class at a time. In the control unit 23, a reference pattern identification number (n) counter 27 is for counting up the reference pattern identification number from unity up to the predetermined natural number N for each class identification number k in the manner shown in FIG. 5 along a seventh line. At least one of the reference pattern identification numbers is selected by a selector 28 as a selected identification number when the specified class comprises the reference pattern, such as the n-th reference pattern $B^n$, which is identified by the selected identification number. The selector 28 produces the reference pattern identification signal n indicative of the selected identification number or numbers.

It is now understood that a combination of the n counter 26 and the selector 28 serves as an activating arrangement responsive to the specified class for activating the reference pattern memory 25 to make the reference pattern memory 25 produce one of the first through the N-th reference patterns at a time that the specified class comprises. A combination of the circuit elements 25 through 28 serves as a memory arrangement for memorizing the first through the N-th reference patterns with the first through the N-th reference patterns classified into the first through the K-th classes according to the first through the N-th reference pattern lengths.

Later in the control unit 23, a concatenation time instant (j) counter (not shown) is counted up to generate a reference pattern vector identification signal j which successively specifies the concatenation time instants j for each selected pattern in the known manner from unity up to the reference pattern length J(n) of the reference pattern specified by the reference pattern identification signal n. In response to the signal j, the reference pattern memory 25 produces the reference pattern feature vectors $b^n_j$ of the specified reference pattern.

Supplied with the input and the reference pattern feature vectors $a_m$ and $b^n_j$, a pattern matching unit 29 carries out pattern matching between the input pattern A and each concatenation C of the selected patterns. The pattern matching is carried out in cooperation with first through fourth table memories 31, 32, 33, and 34, a comparator 35, and boundary recurrence and pointer value table memories 36 and 37. The first through the fourth table memories 31 to 34 are for the minimum recurrence values T(m, q), the reference pattern values N(m, q), the start state values P(m, q), and the start point values U(m, q). The comparator 35 will later be described. The boundary recurrence and pointer value table memories 36 and 37 are for the boundary recurrence and pointer values G(p, n, j) and H(p, n, j). The pattern matching unit 29 will later be described in detail. The table memories 31 through 34, 36, and 37 are similar to those described in the Sakoe patent application. Operation of the table memories will be described also later.

An automaton memory 38 is for memorizing the automaton $\alpha$. As soon as the speech interval signal sp builds down, the automaton memory 38 produces the final states in compliance with the final state set F in the manner which is depicted in FIG. 5 along a third line from the top and will later be described more in detail. Responsive to the final states and in cooperation with the first through the fourth table memories 31 to 34, a decision unit 39 carries out the decision of an optimum concatenation n for the string of input words spoken to the microphone 21.

Figure 6:
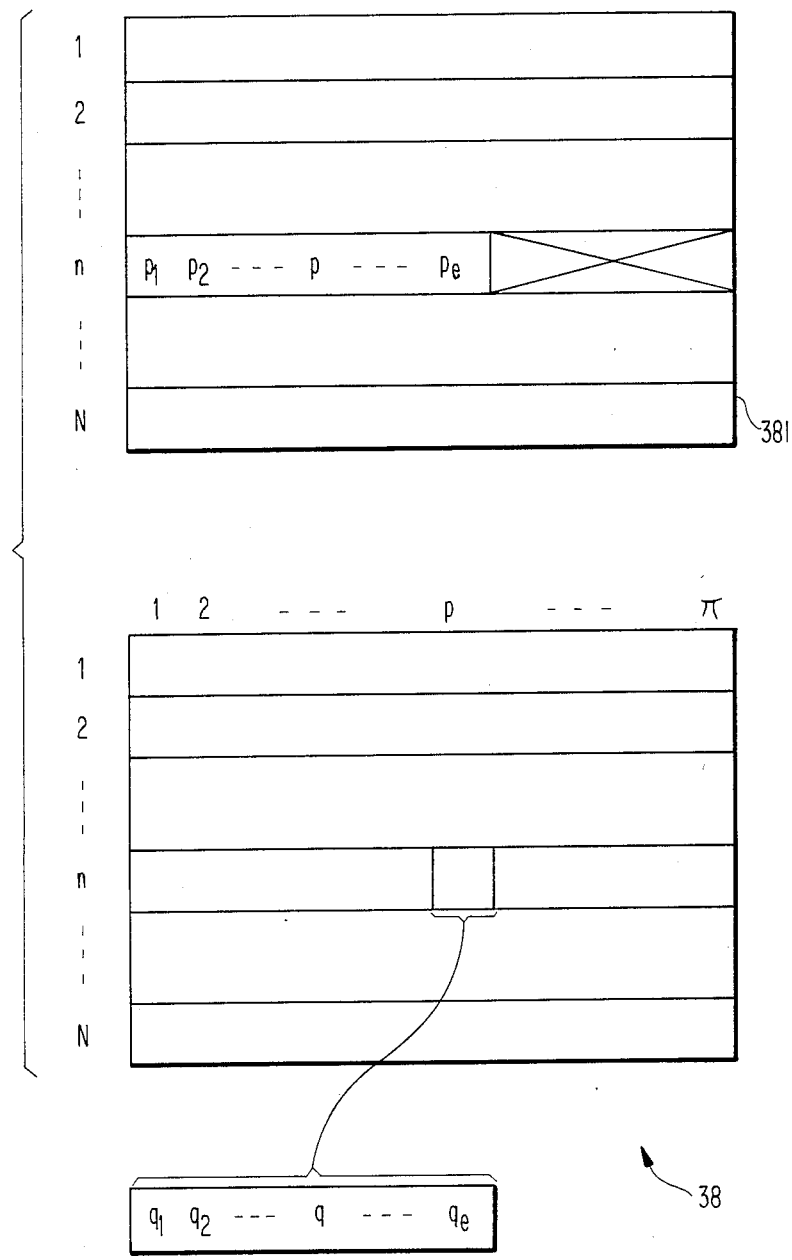
FIG. 6 is a block diagram of a part of an automaton memory for use in the device shown in FIG. 4.
Figure 7A:
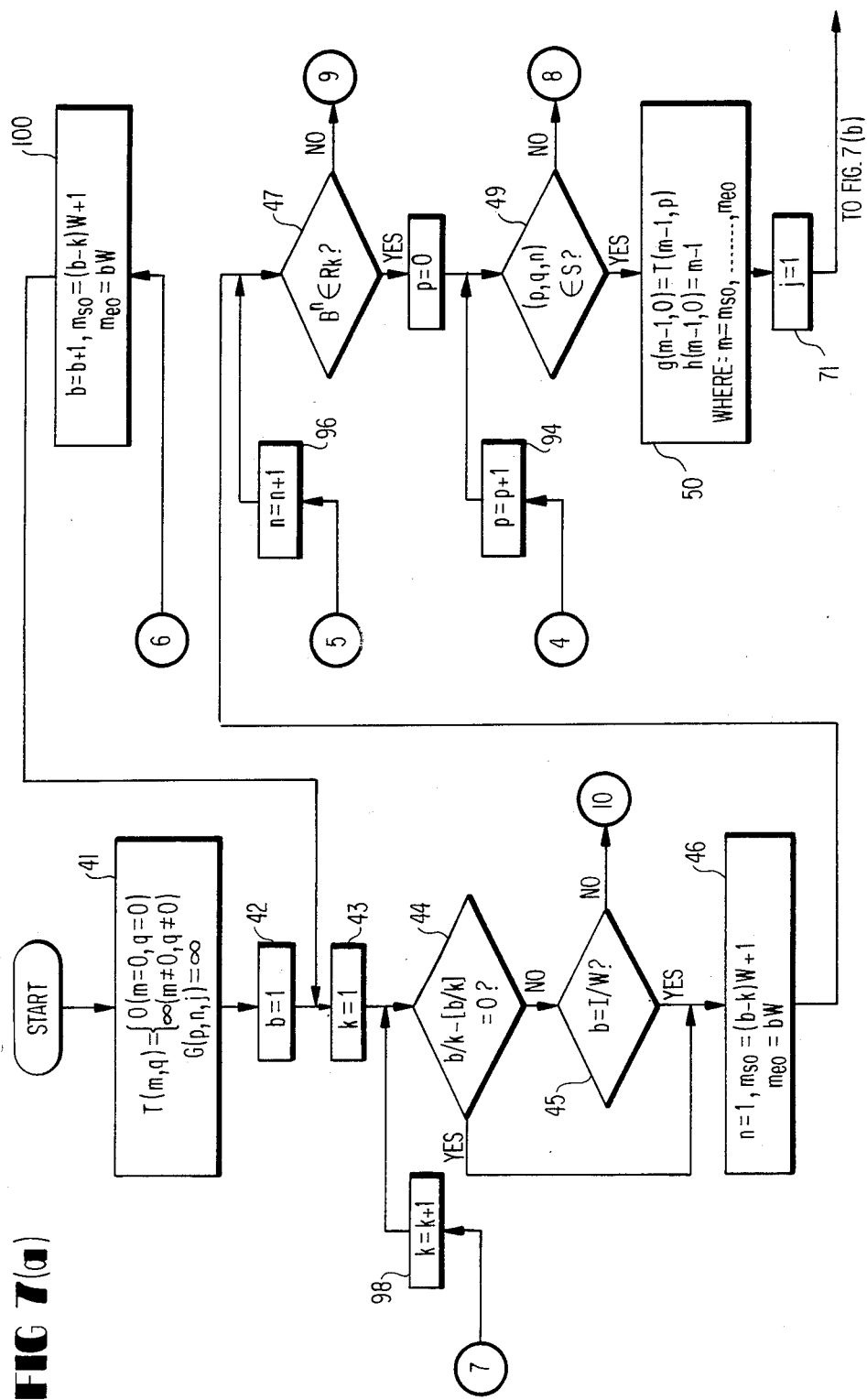
FIGS. 7 (a) through (c) collectively show a flow chart for use in describing operation of the device illustrated in FIG. 4.
Figure 7B:
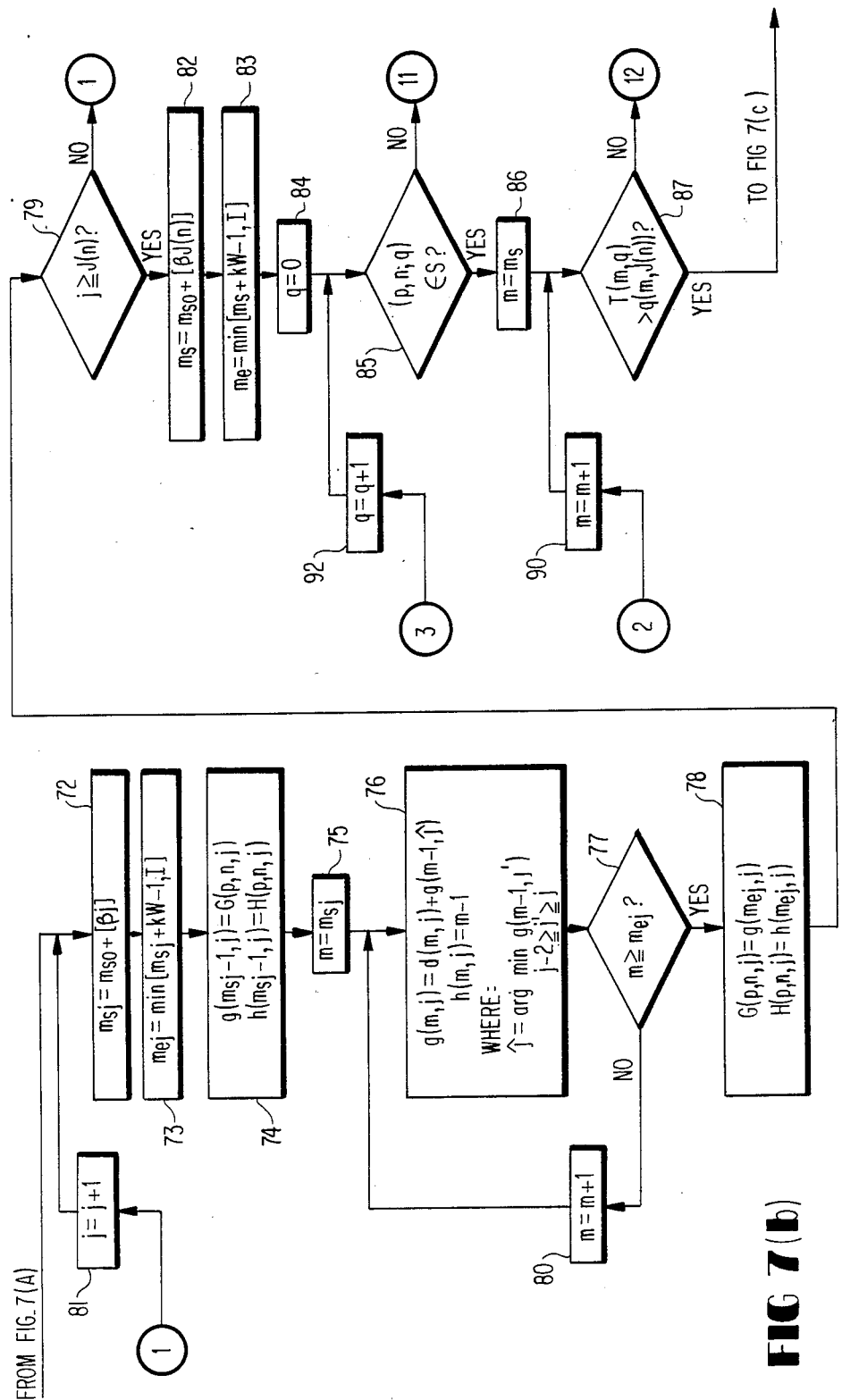
Figure 7C:
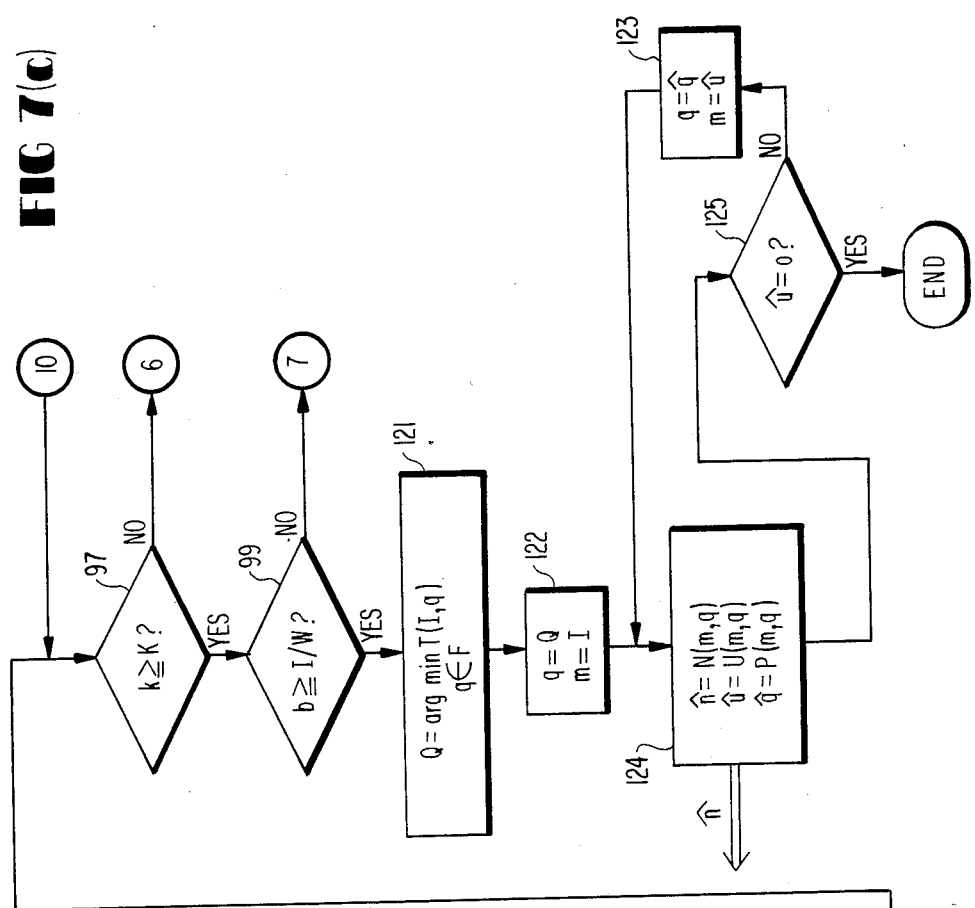
Figure 7C:
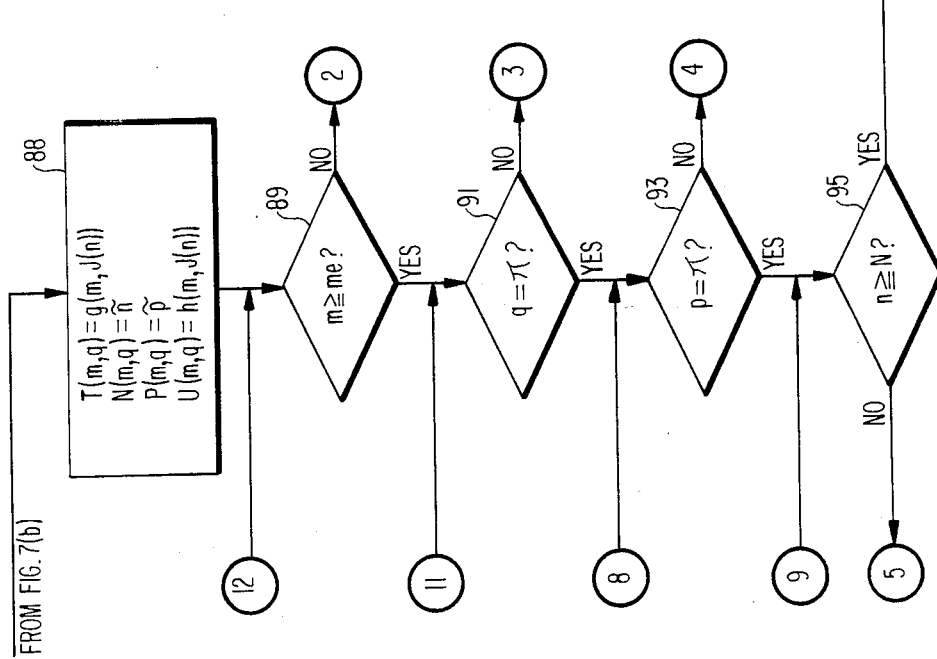

Turning to FIG. 6, the automaton memory 38 comprises first and second memory sections 381 and 382 for the state transition table S like the automaton memory described in the Sakoe patent application. The first section 381 comprises first through N-th memory sectors assigned to the first through the N-th reference patterns, respectively, and accessible by the reference pattern identification signal n generated by the control unit 23. Each memory sector is for memorizing at least one start state p of the reference pattern assigned thereto. For example, the n-th memory sector memorizes a plurality of start states $p_1, p_2, \ldots, p, \ldots,$ and $p_e$ of the n-th reference pattern $B^n$. During each duration in which the n-th reference pattern is specified by the reference pattern identification signal, the first section 381 supplies the control unit 23 with a start state signal p which successively specifies the start states $p_1, p_2, \ldots, p, \ldots,$ and $p_e$ as illustrated in FIG. 5 along an eighth line.

In FIG. 6, the second section 382 comprises first through N-th memory blocks alloted to the first through the N-th reference patterns, respectively, and accessible by the reference pattern identification signal n generated by the control unit 23. Each memory block comprises a plurality of memory areas which are assigned to the start states p of the reference pattern alloted to that memory block and are accessible by the start state signal p representative of the start states. Each memory area is for memorizing at least one end state q of the reference pattern for each of the start states. For example, end states $q_1, q_2, \ldots, q, \ldots,$ and $q_e$ are memorized in a memory area for the n-th reference pattern $B^n$ and one start state p thereof. Within each interval of time in which each start state, such as p, is indicated, the second section 382 supplies the control unit 23 with an end state signal q which successively indicates the end states $q_1$ through $q_e$.

Referring afresh to FIGS. 7 (a) through (c) and more particularly to FIG. 5, operation will be described as regards the device described above with reference to FIGS. 4 and 6. When the speech interval signal sp builds up, the control unit 23 generates an initializing pulse as a first set signal SET1depicted in FIG. 5 along a second line from the top. The first set signal initializes the first table memory 31 and the boundary recurrence value table memory 36 as shown in FIG. 7 (a) at a first step 41. The control unit 23 comprises a block identification number (b) counter (not shown) for use in counting up the block identification number b in the manner depicted in FIG. 5 along a fifth line. At first, the block identification number b is equal to unity as shown in FIG. 7 (a) at a second step 42. While the block identification number is equal to unity, the class identification number (k) counter 26 of the control unit 23 counts up the variable natural number k as already described before in conjunction with the sixth line of FIG. 5. At first, the variable natural number k is equal to unity as shown in FIG. 7 (a) at a third step 43. In the manner indicated at a fourth step 44, the control unit 23 calculates b/k, [b/k], and (b/k−[b/k]) and checks whether or not the block identification number b is an integral multiple of the variable natural number k. If NO, the control unit 23 checks at a fifth step 45 whether or not the block identification number b is equal to I/W. In the meantime, the variable natural number and the block identification number are counted up in the manner which will later be described.

If the block identification number is either an integral multiple of the variable natural number or equal to I/W, the reference pattern identification number (n) counter 27 of the control unit 23 counts up the reference pattern identification number to make the reference pattern identification signal n vary in the manner described in conjunction with the seventh line of FIG. 5. In the same manner shown at a sixth step 46, the reference pattern identification number n is equal at first to unity. The control unit 23 meanwhile calculates the zeroth start through end values $m_{s0}$ to $m_{e0}$. The reference pattern identification number is counted up in the manner described later.

By using the reference pattern identification number n and the variable natural number k, the control unit 23 checks at a seventh step 47 whether or not the n-th reference pattern $B^n$ belongs to the k-th class, namely, an element of the k-th reference pattern subset $R_k$. It is possible to understand that the selector 28 of the control unit 23 selects in this manner the selected identification number or numbers. If YES, a start state (p) counter (not shown) of the control unit 23 counts up the start state identification number p from zero towards the finite number $\pi$ in the manner which will later be described. At an eighth step 48, the start state identification number p is given the initial state 0 (zero). The control unit 23 refers to the first and the second memory sections 381 and 382 of the automaton memory 38 for the start state signal p and the end state signal q in the manner which will later become clear. For the selected identification number indicative of the n-th reference pattern $B^n$, the start state signal p indicates the start states $p_1, p_2, \ldots, p, \ldots$, and $p_e$ in the manner already described in conjunction with the eighth line of FIG. 5.

The control unit 23 checks at a ninth step 49 whether or not the combination (p, q, n) belongs to the state transition rule S. Prior to this instant, the pattern matching is already carried out for the above-described current reference patterns having the end states in common at the start state p in the manner which is described hereinabove and will again be described later. The first table memory 31 therefore memorizes the minimum recurrence values T(m−1, p) for the zeroth start through end values which are already calculated at the sixth step 46. In preparation for a tenth step 50, the control unit 23 generates a second set signal SET2 in the manner depicted in FIG. 5 along a ninth line from the top.

Figure 8:
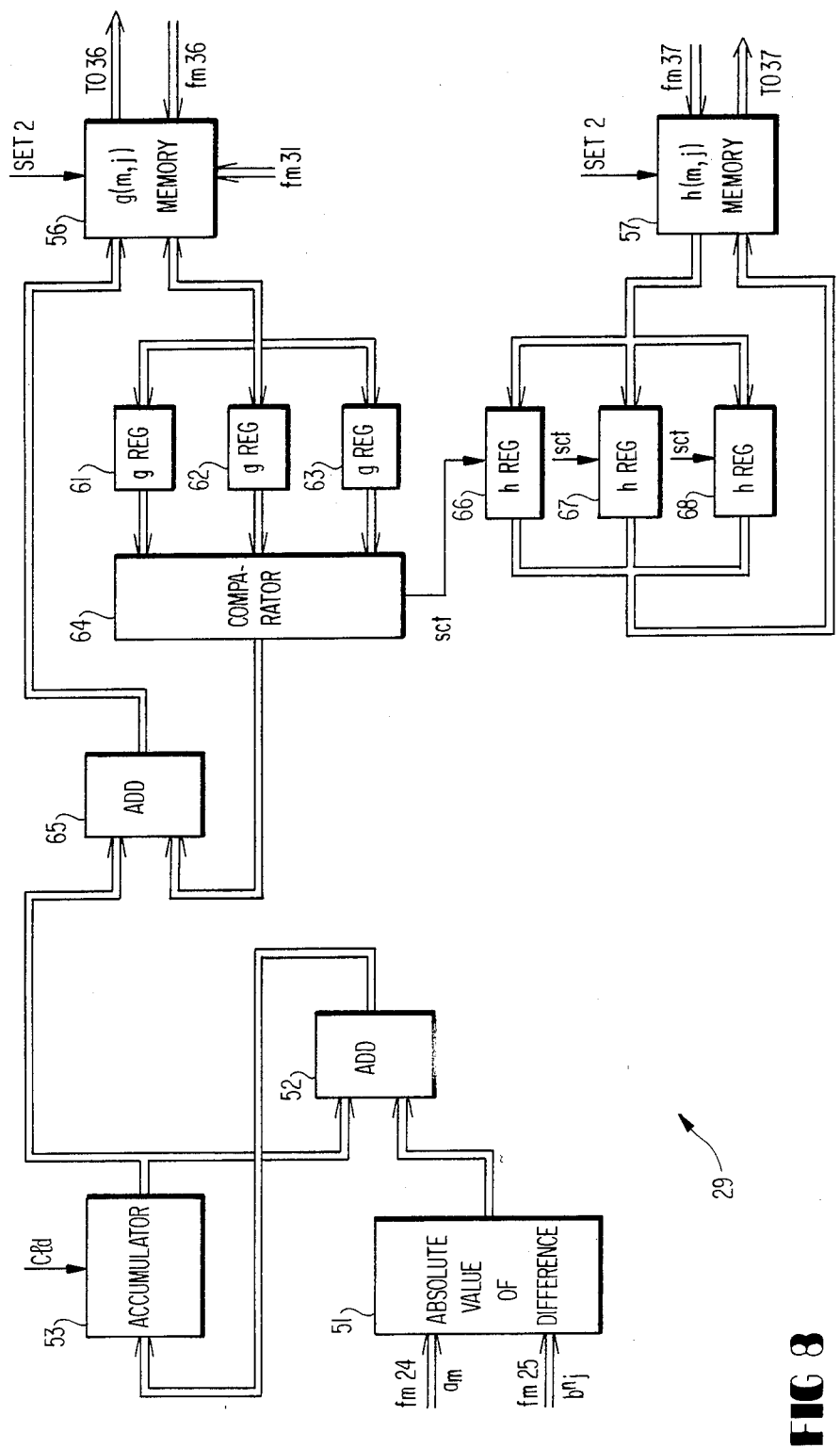
FIG. 8 is a block diagram of a pattern matching unit for use in the device depicted in FIG. 4.

Turning to FIG. 8 for a short while, the pattern matching unit 29 comprises an absolute value calculator 51 for calculating an absolute value of a vector difference between each input pattern feature vector $a_m$ and each reference pattern feature vector $b^n_j$. More particularly, the control unit 23 (FIG. 4) generates a vector component specifying signal r and delivers the signal r to the input buffer 24 and the reference pattern memory 25. The signal r specifies first, second, ..., r-th, ..., and R-th vector components of each feature vector in the manner depicted along a sixteenth or bottom line of FIG. 5 where R represents a natural number which corresponds to the frame. The absolute value calculator 51 is for calculating the difference between the r-th vector components of the feature vectors $a_m$ and $b^n_j$. Such differences are summed up by cooperation of an adder 52 and an accumulator 53 to provide the distance d(m, j). A combination of the circuit elements 51 through 53 therefore serves as a distance calculator. Incidentally, the control unit 23 generates a clear pulse cld prior to generation of the vector component specifying signal r for each pair of feature vectors in the manner illustrated in FIG. 5 along a fifteenth or penultimate line.

In FIG. 8, a recurrence value memory 56 and a pointer value memory 57 are for memorizing the recurrence values g(m, j) and the pointers h(m, j) for use as the above-described previous recurrence values g(m−1, j') and pointers h(m−1, j') and are coupled to the boundary recurrence and values table memories 36 and 37. Through a parallel signal lead depicted in FIG. 4 and partly in FIG. 8, the recurrence value memory 56 is connected to the first table memory 31. Similarly, the pointer value memory 57 is coupled to the control unit 23. At the tenth step 50 (FIG. 7(a)), the second set signal SET2 sets the minimum recurrence values T(m−1, p) in the recurrence value memory 56 and values of (m−1) in the pointer value memory 57 according to the first and the third boundary conditions, namely, for the zeroth start through end values $m_{s0}$ to $m_{e0}$.

In the manner which will presently be described, the control unit 23 (FIG. 4) generates the reference pattern vector identification signal j as depicted in FIG. 5 along a tenth line from the top. As soon as the signal j specifies the j-th reference pattern featre vector $b^n_j$ of the n-th reference pattern $B^n$ under consideration, the control unit 23 generates a third set signal SET3 depicted in FIG. 5 along a twelfth line to set the recurrence values g($m_{sj}$−1, j) and the pointer values h($m_{sj}$−1, j) in the boundary recurrence and pointer value table memories 36 and 37 according to the second and the fourth boundary conditions, that is, for the j-th start through end vaues $m_{sj}$ and $m_{ej}$.

Subsequently, a first input pattern time instant (m1) counter (not shown) of the control unit 23 counts up to generate the afore-menioned first input pattern feature vector identification signal m1 which specifies successively the input pattern feature vectors $a_m$ when the input pattern time instant m is successively varied from the j-th start value $m_{sj}$ up to the j-th end value $m_{ej}$ in the manner shown in FIG. 5 along a thirteenth line. It should be pointed out in this connection that the input pattern feature vectors are used in the pattern matching at a considerably shorter time interval when compared with the reference pattern feature vectors. This is, however, not contradictory to the use of the frames in common to the input pattern A and each of the concatenations in the manner described hereinabove in connection with FIG. 3.

In FIG. 8, the DP technique is put into practive concurrently with calculation of the distance d(m, j) in response to the reference pattern vector identification signal j indicative of the j-th concatenation time instant and the first input pattern vector identification signal m1 indicative of the m-th input pattern time instant. If only three previous recurrence values g(m−1, j′) are used as described before, the previous recurrence values g(m−1, j−2), g(m−1, j−1), and g(m−1, j) are transferred from the recurrence value memory 56 to first through third recurrence value registers 61, 62, and 63. A comparator 64 decides a minimum of the previous recurrence values g(m−1, j′) to produce a selection signal sct which corresponds to the minimum of the previous recurrence values. The comparator 64 furthermore delivers the minimum previous recurrence value g(m−1, j) to an adder 65 which calculates the distance recurrence formula to store the new recurrence value g(m, j) in the recurrence value memory 56. Three previous pointers h(m−1, j′) are likewise transferred to first through third pointer regesters 66, 67, and 68. The selection signal sct selects one of the pointer registers 66 through 68 to calculate the pointer recurrence formula and to provide a new pointer h(m, j), which is stored in the pointer value memory 57.

Turning back to FIGS. 7(a) through (c), the reference pattern vector identification signal j specifies at an eleventh step 71 of FIG. 7(a) the first reference pattern feature vector $b^n{}_1$ of the n-th reference pattern $B^n$ under consideration. In the manner which is described above and will shortly be described again, the concatenation time instant j is varied towards the J(n)-th time instant. The control unit 23 calculates the j-th start and end values $m_{sj}$ and $m_{ej}$ at twelfth and thirteenth steps 72 and 73. In response to the third set signal SET3, the second and the fourth boundary conditions are given at a fourteenth step 74 to the boundary recurrence and pointer value table memories 36 and 37.

The control unit 23 generates at a fifteenth step 75 the first input pattern vector identification signal m1 indicative of the j-th start value $m_{sj}$. At a sixteenth step 76, the distance and the pointer recurrence formulae are calculated in the manner described with reference to FIG. 8. The control unit 23 checks at a seventeenth step 77 whether or not the input pattern time instant m is equal to or greater than the j-th end value $m_{ej}$. If YES, the control unit 23 generates a fourth set signal SET4 in the manner depicted in FIG. 5 along a fourteenth line from the top to substitute at an eighteenth step 78 of FIG. 7(b) the end boundary value and pointer value g($m_{ej}$, j) and h($m_{ej}$, j) in the boundary recurrence and pointer value table memories 36 and 37.

Subsequently at a ninteenth step 79, the control unit 23 checks whether or not the reference pattern vector identification signal j indicates the concatenation time instant j which is equal to or greater than the n-th reference pattern length J(n). If NO at the seventeenth step 77, the control unit 23 makes at a twelfth step 80 the first input pattern feature vector identification signal m1 indicate a next subsequent input pattern time instant.

The steps 76, 77, and 80 are iteratively carried out. If NO at the ninteenth step 79, the control unit 23 makes at a twenty-first step 81 the reference pattern vector identification signal j indicate a next following concatenation time instant. The steps 72 through 81 are iteratively carried out.

If YES at the ninteenth step 79, the control unit 23 calculates the J-th start and end values $m_s$ and $m_e$ at twenty-second and twenty-third steps 82 and 83. An end state (q) counter (not shown) of the control unit 23 counts up to indicate the state identification number p which is now used to represent the end state q. At a twenty-fourth step 84, the end state q is rendered equal to zero. The end state is successively varied towards the finite number π in the manner which will soon be described. For each end state, the control unit 23 checks at a twenty-fifth step 85 whether or not the combination (p, n, q) is included in the state transition table S. If YES, a second input pattern time instant (m2) counter (not shown) of the control unit 23 counts up to generate a second input pattern feature vector identification signal m2 indicative of the J-th start through end values $m_s$ to $m_e$ in the manner depicted in FIG. 5 along an eleventh line. At a twenty-sixth step 86, the signal m2 indicates the J-th start value $m_s$.

Figure 9:
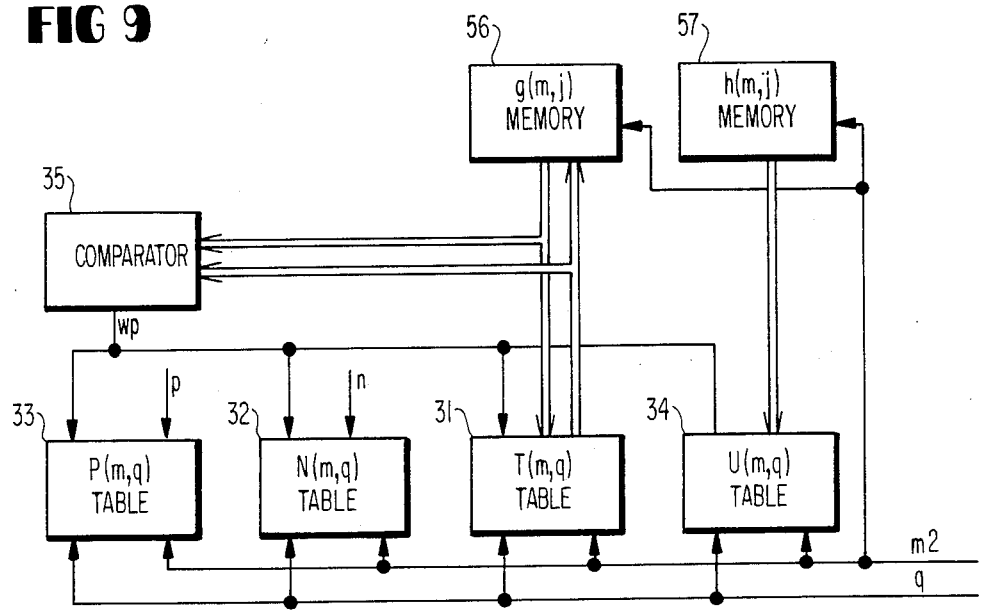
FIG. 9 is a detailed block diagram of a part of the device illustrated in FIG. 4.

Turning temporarily to FIG. 9, minimization is carried out for the pattern end boundary by mainly using the second input pattern vector identification signal m2 and the end states q indicative of the pattern end boundary. The first through the fourth table memories 31 to 34 are already loaded with the minimum recurrence values T(m, q), the reference pattern values N(m, q), the start state values P(m, q), and the start point values U(m, q) in the manner which will presently be described. The recurrence and pointer value memories 56 and 57 are loaded with the pattern end recurrence and pointer values g(m, J(n)) and h(m, J(n)). Accessed by the second input pattern vector identification signal m2 and the end state q, the pattern end recurrence value g(m, J(n)) and the minimum recurrence value T(m, q) are supplied to the comparator 35. Only when the former is less than the latter, the comparator 35 delivers a write pulse wp to the table memories 31 through 34. The minimum recurrence value T(m, q), the reference pattern identification signal n, the start state signal p, and the pattern end pointer h(m, J(n)) are written in the respective table memories 31 to 34. In this manner, the minimum recurrence values T(m, q) and the like are kept in the table memories 31 and others as values indicative of the selected patterns of various concatenations.

Turning back to FIGS. 7(a) through (c) again, the comparator 35 (FIGS. 4 and 9) carries out the minimization in the manner indicated at a twenty-seventh step 87. When the pattern end recurrence value g(m, J(n)) is less than the minimum recurrence value T(m, q), the write pulse wp renews at a twenty-eighth step 88 the first through the fourth table memories 31 to 34. At a twenty-ninth step 89, the control unit 23 checks whether or not the second input pattern vector identification signal m2 indicates the input pattern time instant which is equal to or greater than the J-th end value $m_e$. If NO, the second input pattern time instant counter counts up at a thirtieth step 90. If YES at the step 89, the control unit 23 checks at a thirty-first step 91 whether or not the end state q is equal to the finite number π. If NO, the end state counter is counted up at a thirty-second step 92. The steps 85 through 92 are repeated. If YES at the step 91, the control unit 23 checks at a thirty-third step 93 whether or not the state identification number for the start state p is equal to or greater than the finite number π. If NO, the start state counter is counted up at a thirty-fourth step 94. The steps 49, 50, and 71 through 94 are repeated.

If YES at the step 93, the control unit 23 checks at a thirty-fifth step 95 whether or not the reference pattern identification number n is equal to or greater than the predetermined natural number N. If NO at the step 49, the check is also carried out. If NO at the step 95, the n counter is counted up at a thirty-sixth step 96. The steps 47 through 50 and 71 through 96 are repeated. If YES at the step 95, the control unit 23 checks at a thirty-seventh step 97 whether or not the variable natural number k is equal to or greater than the preselected natural number K. If NO at the step 45, the step 97 is also carried out. If NO at the step 97, the k counter is counted up at a thirty-eighth step 98. If YES at the step 97, the control unit 23 checks at a thirty-ninth step 99 whether or not the block identification number b is equal to or greater than I/W. If NO, the b counter is counted up at a fortieth step 100. The steps 43 through 50 and 71 through 100 are repeated. If YES at the step 97, the speech interval signal sp will build down as will be understood from the first and the fifth lines of FIG. 5.

Subsequently, the control unit 23 makes the automaton memory 38 (FIG. 4) produce the final state set F in the manner depicted along the third line in FIG. 5. It will now be readily possible for one skilled in the art to implement the control unit 23 by using a microprocessor and in consideration of the above-described flow chart and to modify the control unit 23 as regards the counters which are not shown in FIG. 4.

Figure 10:
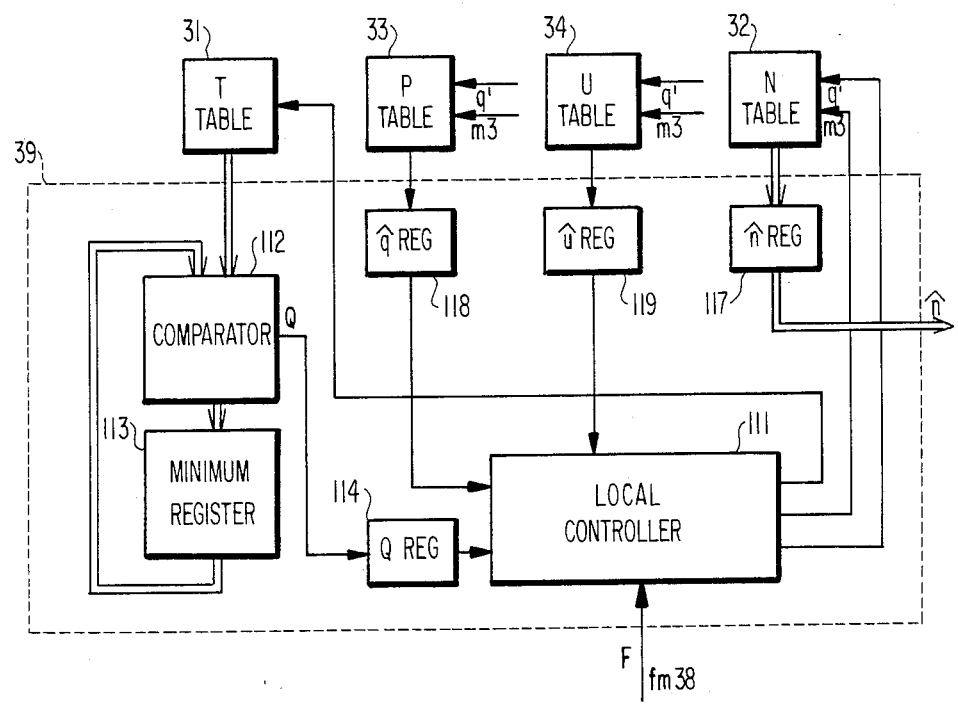
FIG. 10 is a block diagram of a decision unit for use in the device shown in FIG. 4.

Turning to FIG. 10, the decision unit 39 may comprise a local controller 111 supplied with the final state set F from the automaton memory 38 (FIG. 4). It will be assumed that the controller 111 successively specifies first through end final states $q_1, \ldots$, and $q_e$ (the same reference symbols being used) in response to the final state set in the manner depicted in FIG. 5 along the third line from the top.

Responsive to the final states of the final state set F, the first table memory 31 (FIGS. 4 and 10) produces the ultimate recurrence values T(I, q). A combination of a comparator 112 and a minimum register 113 finds a minimum of the ultimate recurrence values to decide the above-mentioned optimum final state Q. An optimum final state (Q) register 114 keeps the optimum final state Q. Thereafter, the controller 111 generates a third input pattern time instant identification signal m3 indicative of the final point I. The signal m3 indicates the input pattern time instants from the final point I towards the initial point 0 (zero) as shown in FIG. 5 along a fourth line from the top and will shortly be described. On the other hand, the controller 111 produces a local end state signal q' in the manner which will become clear as the description proceeds. At first, the signal q' indicates the optimum final state Q kept in the optimum final state register 114 as one of the initial conditions for the decision.

Responsive to the signals m3 and q' indicative of the final point I and the optimum final state Q, the second through the fourth table memories 32 to 34 deliver the optimum reference pattern n̂, end state q̂, and start point û to optimum reference pattern (n̂), end state (q̂), and start point (û) registers 117, 118, and 119. The optimum end state register 118 thereafter takes over the optimum final state register 114. The controller 111 makes the local end state signal q' indicate the optimum end state q̂ and the third input pattern time instant indication signal m3 indicate the optimum start point û. In this manner, the optimum concatenation is decided by the optimum reference patterns n̂ which are successively produced from the optimum reference pattern register 117. The local controller 111 will now readily be implemented. The controller 111 may be included in the control unit 23 (FIG. 4).

Referring back to FIG. 7(c), cooperation of the comparator 112 (FIG. 10) and the minimum register 113 is indicated at a forty-first step 121. Operation of the local controller 111 for the initial conditions is shown at a forty-second step 122. The iterative indication of the optimum end states q̂ and start points û by the third input pattern time instant indication signal m3 and the local end state signal q̂' is indicated at a forty-third step 123. The optimum values n̂, û, and q̂ are decided in the manner indicated at a forty-fourth step 124. In the meantime, the local controller 111 (FIG. 10) checks at a forty-fifth step 125 whether or not the optimum start point û coincides with the initial point 0 (zero). When the coincidence is found by the check, operation of the continuous speech recognition device comes to an end for the string of input words in question. The device is ready for use in recognizing a different string of input words.

While this invention has thus far been described in conjunction with a single preferred embodiment thereof, it will now readily be possible for one skilled in the art to implement various other embodiments of this invention. Above all, the distance recurrence formula may, for example, be:

$$g(m, j) = \min \begin{pmatrix} g(m-2, j-1) + d(m-1, j) + d(m, j) \\ g(m-1, j-1) + d(m, j) \\ g(n-1, j-2) + d(m, j) \end{pmatrix},$$

which provides a higher performance. It is, however, necessary in this event to keep the distance d(m, j) of a previous time instant (m−1) and the recurrence value g(m, j) of a further previous time instant (m−2). Additional memories are necessary besides the boundary recurrence value table memory 36 and the like. Any of other similarity and dissimilarity measures, such as correlation between each input pattern feature vector $a_m$ and each reference pattern feature vector $b^n_j$, may be used instead of the distance d(m, j). Each of the recurrence and pointer value table memories 36 and 37 is described hereinabove as a three-dimensional memory used, for example, in FORTRAN. The table memory may not have a table size of a product of the finite number π, the predetermined natural number N, and the maximum reference pattern length $J_{max}$ but may have a table size equal to a summation of those of first through the N-th reference pattern lengths which are given in the pairs (p, n) of the state transition rule S.

When the pattern matching is carried out by the use of a similarity measure, namely, a negative dissimilarity measure, the minimization must be changed to maximization. It should be understood that a device with such a change is an equivalent of the device so far described with reference to FIGS. 2 through 10.

What is claimed is:

1. In a device for recognizing an input pattern which represents input words continuously spoken according to a finite state grammar and has an input pattern length consisting of a plurality of frames consecutively arranged along a first time axis, said device comprising:

memory means for memorizing first through N-th reference patterns representative of first through N-th reference words, respectively, an n-th one of said reference patterns having an n-th reference pattern length measured in terms of said frames, where N represents a predetermined natural number and n represents a number between one and N;

concatenating means for concatenating said reference patterns into a plurality of concatenations, each concatenation consisting of selected reference patterns which are selected from said first through said N-th reference patterns according to said finite state grammar and are arranged along a second time axis that is orthogonal to said first time axis;

matching means for pattern matching said input pattern with said concatenations in slant parallelogrammic blocks to provide dissimilarity measures between said input pattern and the respective concatenations, each block having a predetermined slope relative to said first time axis and a width and a height which are parallel to said first and said second time axes and equal to a selected number of the frames and to the reference pattern length of each selected reference pattern of each concatenation; and deciding means for deciding a minimum of said dissimilarity measures to recognize said input pattern as one of said concatenations that is pattern matched to said input pattern to provide said minimum of the dissimilarity measures;

the improvement wherein;

said memory means is for memorizing said first through said N-th reference patterns with said first through said N-th reference patterns classified into first through K-th classes according to the first through the N-th reference pattern lengths where K represents a preselected natural number, a k-th class comprising at least one of said first through said N-th reference patterns where k represents a variable natural number variable for said first through said K-th classes;

said matching means being for pattern matching said input pattern with said concatenations to provide said dissimilarity measures at each block in consideration of said width and said predetermined slope and the variable natural number of one of said classes that comprises said each selected reference pattern.

2. A device as claimed in claim 1, wherein said memory means comprises:

a reference pattern memory for memorizing said first through said N-th reference patterns;

specifying means for specifying one of said first through said K-th classes as a specified class at a time; and activating means responsive to said specified class for activating said reference pattern memory to make said reference pattern memory produce one of said first through said N-th reference patterns whose pattern length is fit for said specified class.

3. A device as claimed in claim 1, wherein said first through said K-th reference patterns are classified into said first through said K-th classes with said n-th reference pattern comprised in said k-th class when the length J(n) of said n-th reference pattern is:

$$\beta kW \leq J(n) < \beta(k+1)W,$$

where $\beta$ represents a minimum of the first through the N-th reference pattern lengths.

4. A device as claimed in claim 1, wherein said selected number is selected according to a minimum of said first through said N-th reference pattern lengths and the variable natural number of one of said classes that comprises said each selected reference pattern.

* * * * *

UNITED STATES PATENT AND TRADEMARK OFFICE
CERTIFICATE OF CORRECTION

PATENT NO. : 4,792,976

DATED : December 20, 1988

INVENTOR(S) : MASAO WATARI, Tokyo, Japan

It is certified that error appears in the above-identified patent and that said Letters Patent is hereby corrected as shown below:

Column 6, line 18, delete "necessary" and insert --unnecesary--.

Column 7, line 8, delete "g(m - 1, j)" and insert --g(m - 1, $\hat{j}$),--.

Column 7, line 13, delete "g(m - 1, $\hat{j}$')" and insert --g (m - 1, j')--.

Column 7, line 18, delete "j = arg min g (m - 1.$\hat{j}$')," and insert --$\hat{j}$ = arg min g(m - 1, j'),--

Column 7, line 21, delete "$\hat{j}$-2$\leq$j'$\leq$j." and insert --j - 2 $\leq$ j' $\leq$ j.--.

Column 7, line 61, delete "intefral" and insert --integral--.

Column 12, line 51, delete "precessing" and insert --processing--.

UNITED STATES PATENT AND TRADEMARK OFFICE
CERTIFICATE OF CORRECTION

PATENT NO. : 4,792,976

DATED : December 20, 1988

INVENTOR(S) : MASAO WATARI, Tokyo, Japan

It is certified that error appears in the above-identified patent and that said Letters Patent is hereby corrected as shown below:

Column 16, line 37, delete "values table memories" and insert --pointer value table memories--.

Column 16, line 52, delete "featre" and insert --feature--.

Column 17, line 9, delete "practive" and insert --practice--.

Column 20, line 17, delete "$\hat{q}'$" and insert --q'--.

Signed and Sealed this

Twenty-second Day of August, 1989

Attest:

DONALD J. QUIGG

*Attesting Officer*　　　　*Commissioner of Patents and Trademarks*